3,254,016
APPARATUS FOR DEMINERALIZING RAW WATER
Edgar S. Stoddard, Oak Park, Ill., assignor to General Electric Company, a corporation of New York
Filed Nov. 2, 1961, Ser. No. 149,750
9 Claims. (Cl. 204—301)

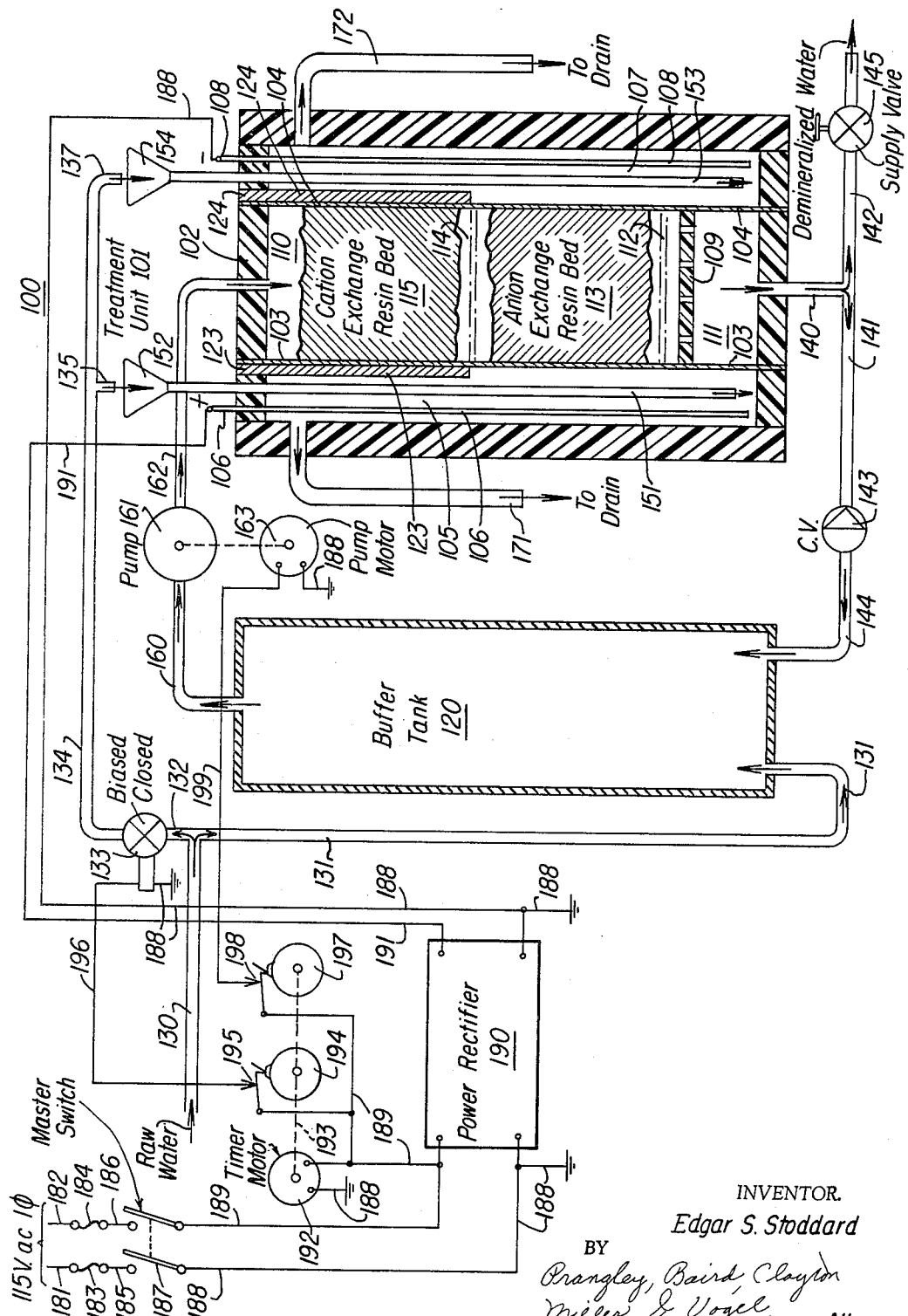

The present invention relates to water demineralizing apparatus, and particularly to such apparatus employing a water treatment unit containing both cation exchange resin and anion exchange resin, the water treatment unit involving both ion exchange and electrodialysis.

It is a general object of the invention to provide an improved apparatus of the character noted employing a water treatment unit having therein both a separate bed of cation exchange resin and a separate bed of anion exchange resin, the water treatment unit including structure to pass a direct current along parallel paths through the resins to regenerate the resins by means of electrodialysis and also including an arrangement for substantially matching the regenerating rates of the two resin beds, so that following a draw-off of demineralized water from the system, substantially equal recovery or regeneration of the two resin beds takes place during a given recovery time interval.

Another object of the invention is to provide in the apparatus of the character noted, an improved arrangement of applying the regenerating current to the resin beds so that the rates of regeneration thereof are substantially matched, with the result that the regeneration states of the two resin beds are always substantially equal in order to avoid relatively low pH water or relatively high pH water in the demineralized water outlet.

Still another object of the invention is to provide in apparatus of the character noted, an improved arrangement for regenerating ion exchange resin beds, wherein the resin beds have substantially equal total ion exchange capacities in total grains of dissolved solids that can be extracted from raw water between regenerations of the beds.

A further object of the invention is to provide in apparatus of the character noted, a barrier having a relatively high electrical resistance in the path of current flow through the bed of cation exchange resin to provide an average electrolytic displacement of sorbed cations from the cation exchange resin substantially equal to the electrolytic displacement of sorbed anions from the anion exchange resin in a given interval of time.

Further features of the invention pertain to the particular arrangement of the elements of the apparatus, whereby the above-outlined and additional operating features thereof are attained.

The invention, both as to its organization and method of operation, together with further objects and advantages thereof, will best be understood by reference to the following specification taken in connection with the accompanying drawing, in which the figure is a diagrammatic illustration of a water demineralizing apparatus embodying the present invention.

At the outset, it is noted that the present invention is predicated upon the discovery that the performance characteristics of a water demineralizing system embodying electrodemineralizing apparatus involving both ion exchange and electrodialysis can be drastically improved by controlling the current flow through the cation exchange resin bed and the anion exchange resin bed in a manner to provide an average electrolytic displacement of sorbed cations from the cation exchange resin bed substantially equal to the electrolytic displacement of sorbed anions from the anion exchange resin bed. This improved apparatus takes advantage of the particular recovery characteristics of the cation exchange resin and the anion exchange resin, respectively, incorporated in the apparatus. More particularly, in two comparable resin beds having approximately the same ion exchange capacities and at substantially the same state of generation, it will be observed that the cation exchange resin bed has a relatively low specific resistance and the anion exchange resin bed has a relatively high specific resistance. In some resins useful in water demineralizing apparatus, the ratio between the two specific resistances mentioned may be less than about 1:3. Accordingly, following unit degeneration of the two resin beds and with the same direct voltage applied between the anodes and the cathodes associated with the beds, the regenerating current through the cation exchange bed is at least about three times that through the anion exchange bed, whereby to pass the required coulombs to effect substantially equal regenerations of the two resin beds, approximately one unit of time is required for regeneration of the cation exchange resin bed and approximately three units of time are required for regeneration of the anion exchange resin bed. Moreover, these time intervals become further disproportional in the event of the degeneration of the beds in excess of one unit, due to the normal recovery rates of the beds; whereby the state of generation of the cation exchange resin bed frequently becomes substantially higher than that of the anion exchange resin bed, in the event of an excess draw-off of demineralized water from the system, with the result that in the subsequent draw-off "acid water" is obtained, as the cation exchange resin bed is far more effective than the anion exchange resin bed.

Now it has been observed that the time interval required to effect a complete regeneration of the cation exchange resin bed may be substantially matched to the time interval required to effect the complete regeneration of the anion exchange resin bed by applying the same direct voltage to the beds and disposing a barrier having a relatively high electrical resistance between the anode and the cathode and in the path of current flow through the cation exchange bed to provide an average electrolytic displacement of sorbed cations from the cation exchange resin bed substantially equal to the electrolytic displacement of sorbed cations from the anion exchange resin bed. Hence, in accordance with the apparatus of the present invention, the regeneration of the two beds substantially matches each other at all times so that the states of generation thereof are substantially matched with each other at all times, so as to avoid low pH water and high pH water in the outlet of the demineralizing apparatus.

Referring now to the figure, the demineralizing system 100 there illustrated, and embodying the features of the present invention, is especially designed for home use, and essentially comprises a treatment unit 101, a buffer tank 120, a raw water supply pipe 130, and a demineralized or treated water supply pipe 140. The raw water in the raw water supply pipe 130 is under pressure and is connected to the city water main, not shown; while the demineralized water supply pipe 140 is normally connected through a supply valve 145 to the water heater, not shown, in the home. The raw water in the supply pipe 130 contains substantial dissolved mineral salts supplying thereto such cations as: $Ca^{++}$, $Mg^{++}$, $Fe^{++}$, $Na^+$, $K^+$, etc., and such anions as: $HCO_3^-$, $SO_4^{--}$, $Cl^-$, $CO_3^{--}$, etc. Moreover, this raw water may be quite hard and may have a total dissolved solids content as high as about 70 grains per gallon (1200 p.p.m.). In the operation of the treatment unit 101, the raw water is demineralized, whereby the demineralized or treated water delivered to the supply pipe 140 has a total dissolved solids containing not in excess of 3 grains per gallon (51 p.p.m.).

Fundamentally, the treatment unit 101 comprises an outer shell 102, a pair of permeable diaphragms or membranes 103 and 104 arranged within the outer shell 102 and cooperating therewith to define an anolyte chamber 105 having a rod-like anode 106 therein and a catholyte chamber 107 having a rod-like cathode 108 therein. The elements 102, 103 and 104 are arranged in an upstanding position, the diaphragms 103 and 104 defining therebetween a treatment chamber which is provided with a transverse apertured plate 109 dividing the area into an upper resin containing chamber 110 and a lower treated water collecting chamber 111. Disposed upon the apertured plate 109 is a porous mass of glass fibers 112 supporting thereon a porous anion exchange bed 113, which accommodates the ready passage therethrough of the water undergoing treatment and essentially comprises a loosely packed mass of anion exchange material (preferably a synthetic organic polymeric anion exchange resin). Disposed on top of the bed 113 is a second mass of loosely packed glass fibers 114, upon which rests the cation exchange resin bed 115, which accommodates the ready passage therethrough of the water undergoing treatment and essentially comprises a loosely packed mass of cation exchange material (preferably a synthetic organic polymeric cation exchange resin). The two beds 113 and 115 are so related that they have substantially equal cation and anion exchange capacities in total grains of dissolved solids that may be removed from the water undergoing treatment.

More particularly, this anion exchange resin is of bead-like formation and may comprise the strong-base resin sold under the name "Amberlite IRA–410"; and this cation exchange resin is of bead-like formation and may comprise the strong-acid resin sold under the name "Amberlite IR–120." An anion exchange resin of the type specified essentially comprises a stable insoluble synthetic organic polymer, active basic functional groups chemically bonded thereto and dissociable into free mobile anions to impart a positive charge to the polymer, and water in gel relationship with the polymer. Similarly, a cation exchange resin of the type specified essentially comprises a stable insoluble synthetic organic polymer, active acidic functional groups, chemically bonded thereto and dissociable into free mobile cations to impart a negative charge to the polymer, and water in gel relationship with the polymer. The active basic functional groups attached to the associated organic polymer are oriented with respect to the interfaces thereof so as to be partially or completely dissociable in the internal gel water into fixed positive ions linked to the polymer and into mobile exchangeable negative ions, and similarly, the active acidic functional groups attached to the associated organic polymer are oriented with respect to the interfaces thereof so as to be partially or completely dissociable in the internal gel water into fixed negative ions linked to the polymer and into mobile exchangeable positive ions.

Typical such polymers to which active basic functional groups may be attached include: urea-formaldehyde resins, melamine-formaldehyde resins, polyalkylene-polyamine-formaldehyde resins, and the like; and such suitable active basic functional groups include: quaternary ammonium hydroxides, amino groups, the guanidyl group, the dicyanodiamidine group, and like organic nitrogen-containing basic groups; the quaternary ammonium hydroxide groups, the guanidyl and dicyanodiamidine groups being usually preferred because of their high dissociation constants. Typical such polymers to which active acidic functional groups may be attached include: phenol-aldehyde resins, polystyrene-divinylbenzene copolymers, and the like; and such suitable active acidic functional groups include: —$SO_3H$, —COOH, and the like; —$SO_3H$ being usually preferred because of its high dissociation constant. Normally the water in gel relationship with the polymer should be present in an amount of at least 15% of the weight of the dry resin.

The buffer tank 120 may be formed of steel; and raw water to be treated is supplied to the bottom of the buffer tank 120 from the raw water supply pipe 130 through a connecting pipe 131. Raw water is also supplied to flush the anolyte and catholyte chambers from the supply pipe 130 through a connecting pipe or conduit 132. A normally closed electromagnetically operated solenoid valve 133 is disposed in the conduit 132 and in turn connects to a pipe 134 having outlets 135 and 137 for the anolyte chamber 105 and the catholyte chamber 107, respectively. The outlet pipe 140 connecting with the lower portion of the chamber 111 is connected to a first pipe 141 which conveys treated water to the buffer tank 120 and to a second pipe 142 which conducts treated and demineralized water to the point of use. A check valve 143 has the input connection thereof attached to the pipe 141 and the output connection thereof attached to a pipe 144 connecting the outlet of the check valve 143 to the bottom of the buffer tank 120, the check valve 143 being arranged so that treated water can flow only to the left through the pipe 141 from the treatment unit 102 into the buffer tank 120, the check valve 143 closing and preventing reverse flow from the buffer tank 120 into the pipes 140, 141 and 142. The delivery pipe 142 has a manually operable valve 145 therein for controlling the flow of demineralized water from the delivery pipe 142.

The upper portion of the buffer tank 120 is connected by a pipe 160 to the inlet of a circulating pump 161, the outlet of the pump 161 communicating with a pipe 162 which in turn communicates with the upper portion of the treatment unit 101 and particularly with the upper portion of the treatment chamber 110 thereof. The pump 161 is suitably driven by an electric motor 163 drivingly connected thereto. Accordingly, it will be understood that the raw water to be demineralized is supplied from the pipe 130 via the pipe 131 into the lower portion of the buffer tank 120. The water is circulated through the buffer tank 130 and thence flows via the pipe 160 under the action of the pump 161 and via the pipe 162 into the upper portion of the treatment chamber 110 and through the porous resin beds 113 and 115 and thence into the collecting chamber 111. The treated water further flows from the collecting chamber 111 through the pipe 140 via the check valve 143 and the pipe 144 into the lower portion of the buffer tank 120. If there is a demand for treated water, the water may also flow from the collecting chamber 111 via the pipes 140 and 142 and the valve 145 to the point of use. In the circulation of the water as described above, it is demineralized; whereby the demineralized water is accumulated in the buffer tank 120 and the treatment unit 101 for dispensing through the outlet pipe 142 as required.

The lower portion of the anolyte chamber 105 communicates with an upstanding conduit 151 extending upwardly through the anolyte chamber 105 and to the exterior of the outer shell 102 and is provided on the upper end thereof with a funnel 152 for the delivery of anode wash water into the anolyte chamber 105 from the outlet 135. Similarly, the lower portion of the catholyte chamber 107 communicates with an upstanding conduit 153 which extends through the upper portion of the outer shell 102 and is provided at the upper end thereof with a funnel 154 for the delivery of cathode wash water into the catholyte chamber 107 from the outlet 137. Accordingly, raw water can be fed from the supply pipe 130 through the pipe 132 under the control of the solenoid valve 133 and via the pipe 134 and the outlets 135 and 137 thereon into the funnels 152 and 154, respectively, to supply new wash water to the anolyte chamber 105 and the catholyte chamber 107, respectively. Upon the addition of new wash water to the anolyte chamber 105, the excess anolyte flows therefrom through a pipe 171 communicating with the upper portion of the anolyte chamber 105, and upon addition of new wash water to the catholyte chamber 107, the excess catholyte flows therefrom through a pipe 172 communicating with the upper portion of the catholyte chamber 107. Accordingly, the pipes 171 and 172 serve to regulate the maximum amount of anolyte and catholyte present in the anolyte chamber 105 and the catholyte chamber 107, respectively.

Further, the system 100 comprises a source of electric power of 115 volts A.-C., single-phase, including two conductors 181 and 182 respectively, connected through fuses 183 and 184 and conductors 185 and 186 to a master switch 187. The master switch 187 when closed further connects the conductors 185 and 186 to conductors 188 and 189, respectively, connected to the input terminals of an associated power rectifier 190, the conductor 188 being connected to ground potential. The output terminals of the rectifier 190 are connected to two conductors 188 and 191 which are connected to the cathode 108 and to the anode 106, respectively, to apply the desired operating potentials thereto.

The system 100 further comprises a timer motor 192 of the synchronous type and bridged across the conductors 188 and 189. Preferably, the timer motor 192 is of the "Telechron" type and comprises a shaft 193 having a first switch actuating cam 194 driven thereby for controlling the opening and closing of a switch 195. The switch 195 is biased open and when closed by the cam 194 connects the conductor 189 to a conductor 196 whereby to apply electrical energy to one of the input terminals of the solenoid valve 133, the other terminal of the solenoid valve 133 being grounded through the conductor 188. Also driven by the timer motor shaft 193 is a second switch actuating cam 197 controlling a normally biased open switch 198. When the cam 197 is in position to close the switch 198, the switch applies electrical energy to one of the input terminals of the pump motor 163 which has the other input terminal thereof grounded through the conductor 188.

In view of the foregoing, it will be understood that in the operation of the apparatus 100, the timer motor 192 periodically closes and later opens the switch 195 whereby the solenoid of the valve 133 is correspondingly energized and later de-energized periodically. When the solenoid of the valve 133 is thus energized, the valve 133 is operated from its closed position into its open position so as to supply water through the pipe 134 and the outlets 135 and 137 thereon to be used as fresh anolyte and fresh catholyte, the water being communicated to the respective anolyte and catholyte chambers via the funnel 152 and the conduit 151 in the case of the anolyte and via the funnel 154 and the conduit 153 in the case of the catholyte and thus into the anolyte chamber 105 and the catholyte chamber 107, respectively. When fresh anolyte is thus supplied into the anolyte chamber 105, the anolyte therein is displaced therefrom and flows via the pipe 171 to the drain (not shown); and likewise, when fresh catholyte is thus supplied into the catholyte chamber 107, the catholyte therein is displaced therefrom and flows via the pipe 172 to the drain (not shown). Also in the operation of the apparatus 100, the timer motor 192 periodically closes and later opens the switch 198, whereby the electric drive motor 163 is correspondingly periodically operated to effect corresponding operation of the pump 161, with the result that the water undergoing treatment is circulated from the treatment chamber 110 of the treatment unit 101 and through the buffer tank 120 and then back to the treatment chamber 110; whereby the circulated water is demineralized as previously noted.

In the system 100, the conduits 140, 141, 142 and 162, or at least appropriate sections thereof, are formed of insulating material in order to minimize stray electric currents therebetween by virtue of the fact that the voltage with respect to ground potential of the upper portion of the treatment unit 101 may be essentially different from that in the bottom of the treatment unit 101.

In a constructional example of the treatment unit 101, the anion exchange resin bed 113 and the cation exchange resin bed 115 will have equal volumes and will contain equal volumes of resin. Moreover, in the system 100, the water pressure in the treatment unit 101 should not be in excess of 45 p.s.i. When the resin beds 113 and 115 are fully regenerated and a draw-off of demineralized water from the supply pipe 142 is effected, the beds 113 and 115 are degenerated by substantially equal amounts, whereby it is desirable that the rates of recovery or regeneration of the beds 113 and 115 should be equal in the time interval immediately following the draw-off of demineralized water from the pipe 142. In the arrangement of the anode 151 and the cathode 153 with respect to the resin beds 113 and 115 and the diaphragms 103 and 104 illustrated in the figure, electrical potential between the anode 151 and the cathode 153 is applied across the beds 113 and 115 in parallel relation so as to cause separate electrolytic displacement of sorbed cations from the cation exchange resin in the bed 115 through the diaphragm 104 into catholyte in the catholyte chamber 107 and of sorbed anions from the anion exchange resin in the bed 113 through the diaphragm 103 into the anolyte in the anolyte chamber 105. The rate of electrical regeneration of the resin beds 113 and 115 with like potentials and parallel fields applied thereto are substantially different, the cation exchange resin in the bed 115 regenerating substantially faster than the anion exchange resin in the bed 113, this being due to the fact that the cation exchange resin bed 115 has a relatively low specific resistance and the anion exchange resin bed has a relatively high specific resistance. In a particular example, the anion exchange resin bed 113 when fully regenerated has a specific resistance of 2800 ohms/cm.$^3$; whereas, the cation exchange resin bed 115 when fully regenerated has a specific resistance of 1700 ohms/cm.$^3$. The disparity between the specific resistances of the beds 113 and 115 is even greater as degeneration thereof proceeds and upon exhaustion of the beds, it is found that the anion exchange resin bed 113 has a specific resistance of 1800 ohms/cm.$^3$ and the cation exchange resin bed 115 has a specific resistance of 800 ohms/cm.$^3$. In a typical example of a partially exhausted condition of the beds 113 and 115, the anion exchange resin bed 113 has a specific resistance of 2200 ohms/cm.$^3$ and the cation exchange resin bed 115 has a specific resistance of only 1100 ohms/cm.$^3$.

This disparity in the specific resistances of the two beds 113 and 115 accounts in a large measure for the fact that the cation exchange resin bed 115 regenerates substantially faster under the same electrical conditions as does the anion exchange resin bed 113, since a substantially larger portion of the available coulomb current flows throw the cation exchange resin bed 115. As resin beds 113 and 115 are regenerated, their relative electrical conductivities change, as has been explained above, with the effect that the more highly regenerated cation exchange resin bed 115 becomes even more conductive relative to the anion exchange resin bed 113 so that the condition of imbalance between the relative conductivities thereof becomes greater as the regeneration proceeds and particularly so when there is a high degree of exhaustion of the resins in the beds.

It has now been found that this imbalance in the relative conductivities of the beds 113 and 115 during electrical regeneration thereof can be corrected and compensated for by the provision of the barriers 123 and 124 placed in the path of the current flow between the anode 106 and the cathode 108 through the cation exchange bed 115. Although two barriers 123 and 124 have been illustrated in the drawing, a single barrier properly constructed can be used in accordance with the present invention. Each of the barriers 123 and 124 is formed of a porous ceramic material which is permeable but which provides a substantial resistance to current flow between the anode 107 and the cathode 108 through the cation exchange resin bed 115. As illustrated, the barriers 123 and 124 are disposed in the anolyte chamber 105 and the catholyte chamber 107, respectively, and against the associated diaphragms 103 and 104, respectively, and cover substantially all portions of the diaphragms 103 and 104 in contact with and in alignment with the cation exchange resin bed 115, whereby the barriers 123 and 124 are coterminous with that area of the diaphragms 103 and 104, respectively, in contact with the cation exchange resin bed 115. When utilizing the resin beds 113 and 115 having the specific resistances set forth above and with a typical state of degeneration of the resins within the beds 113 and 115, the resistance of the anion exchange resin bed 113 may have an effective value R1 and the resistance of the cation exchange resin bed 115 may have an effective value R2, and the composite resistances of the barriers 123 and 124 may have an effective value R3, wherein $R1=R2+R3$. Thus, in the arrangement, the composite effective series resistance of the cation exchange resin bed 115 and the barriers 123 and 124 is substantially equal to the effective resistance of the anion exchange resin bed 113.

The provision of the barriers 123 and 124, accordingly, will balance the effective resistances of the resin beds 113 and 115 so as to improve the regeneration efficiency thereof and so as to cause regeneration thereof at substantially the same rates at all times, thereby to maintain the two resin beds 113 and 115 at substantially the same state of regeneration at all times during operation of the treatment unit 101.

The barriers 123 and 124 provide a substantially constant component of resistance in the path of current flow through the cation exchange resin bed 115 and furthermore are preferably of sheet-like construction, as illustrated, and are ion permeable as explained above. Instead of being formed as separate members and of a porous ceramic material, it is also contemplated that the barriers 123 and 124 may constitute a thickening of the associated diaphragms 103 and 104 in the area thereof in contact with the cation exchange resin bed 115, the increased thickness of the diaphragms 103 and 104 in this area providing the necessary increase in resistance to current flow through the cation exchange resin bed 115.

From the foregoing, it will be seen that water passing through the treatment unit 101 will be demineralized and the state of regeneration of the resin beds 113 and 115 will be substantially equal, whereby equal molar amounts of anions and cations are removed from the water, thus maintaining the pH of the treated water substantially the same as that of the raw water entering the treatment unit 101. Moreover, the regeneration of the anion exchange resin bed 113 will proceed at substantially the same rate as the cation exchange resin bed 115 whereby to achieve substantially matching regeneration of the two beds 113 and 115 at all times.

Recapitulating: in the system of the present invention, the water to be demineralized is first introduced into a buffer tank containing previously demineralized water so that it is substantially diluted; and the resulting mixed water is circulated in a local loop circuit from the buffer tank through a cation exchange resin bed and an anion exchange resin bed and back to the buffer tank. The cation exchange resin bed and the anion exchange resin bed are regenerated by like amounts at substantially like rates so that the regeneration of the anion exchange resin bed substantially matches the regeneration of the cation resin bed. The equal regeneration rates of the two resin beds is achieved by adjusting the resistances thereof to be substantially equal by inserting a barrier having a relatively high electrical resistance between the anode and the cathode and in the path of current flow through the cation exchange resin bed to provide an average electrolytic displacement of sorbed cations from the cation exchange resin bed through the associated membrane into the catholyte in the catholyte chamber substantially equal to the average electrolytic displacement of sorbed anions from the anion exchange resin bed through the associated membrane into the anolyte in the anolyte chamber.

In view of the foregoing, it is apparent that there has been provided an improved water demineralizing system involving both ion exchange and electrodialysis wherein the recovery or regeneration rates of the anion exchange resin bed and the cation exchange resin bed are substantially matched so that the states of charge or regeneration of the two beds are always substantially matched in the operation of this system.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. Apparatus for demineralizing raw water containing dissolved metal salts, comprising an electrolytic cell having first and second and third chambers, a first ion permeable membrane disposed as a common wall between said first and second chambers, a second ion permeable membrane disposed as a common wall between said second and third chambers, a first bed of cation exchange resin and a second bed of anion exchange resin both disposed in said second chamber, said beds being separate and distinct with respect to each other, the ion exchange resins in said beds also extending in parallel relation with each other between said membranes, means for passing the raw water through said second chamber and into contact with said beds and also into contact with said membranes so as to effect demineralization thereof, an anode disposed in said first chamber, a cathode disposed in said third chamber, said first chamber being adapted to contain a body of anolyte therein in contact with said first membrane and said anode, said third chamber being adapted to contain a body of catholyte therein in contact with said second membrane and said cathode, means for applying an electrical potential between said anode and said cathode and across the ion exchange resins in said beds in parallel relation so as to cause separate electrolytic displacement of sorbed cations from the cation exchange resin in said first bed through said second membrane into the catholyte in said third chamber and of sorbed anions from the anion exchange resin in said second bed through said first membrane into the anolyte in said first chamber, thereby to effect electrical regeneration of the cation exchange resin in said first bed and of the anion exchange resin in said second bed, the ion exchange resin in one of said beds having a relatively low electrical resistance between said membranes and the ion exchange resin in the other of said beds having a relatively high electrical resistance between said membranes, and a barrier having a relatively high electrical resistance and disposed between said anode and said cathode and in the path of current flow through the ion exchange resin in said one bed to provide an average electrolytic displacement of sorbed ions from the ion exchange resin in said one bed that is substantially equal to the electrolytic displacement of sorbed ions from the ion exchange resin in said other bed.

2. Apparatus for demineralizing raw water containing dissolved metal salts, comprising an electrolytic cell havfirst and second and third chambers, a first ion permeable membrane disposed as a common wall between said first and second chambers, a second ion permeable membrane disposed as a common wall between said second and third chambers, a first bed of cation exchange resin and a second bed of anion exchange resin both disposed in said second chamber, said beds being separate and distinct with respect to each other, the ion exchange resins in said beds also extending in parallel relation with each other between said membranes, means for passing the raw water through said second chamber and into contact with said beds and also into contact with said membranes so as to effect demineralization thereof, an anode disposed in said first chamber, a cathode disposed in said third chamber, said first chamber being adapted to contain a body of anolyte therein in contact with said first membrane and said anode, said third chamber being adapted to contain a body of catholyte therein in contact with said second membrane and said cathode, means for applying an electrical potential between said anode and said cathode and across the ion exchange resins in said beds in parallel relation so as to cause separate electrolytic displacement of sorbed cations from the cation exchange resin in said first bed through said second membrane into the catholyte in said third chamber and of sorbed anions from the anion exchange resin in said second bed through said first membrane into the anolyte in said first chamber, thereby to effect electrical regeneration of the cation exchange resin in said first bed and of the anion exchange resin in said second bed, the cation exchange resin in said first bed having a relatively low electrical resistance between said membranes and the anion exchange resin in said second bed having a relatively high electrical resistance between said membranes, and a barrier having a relatively high electrical resistance and disposed between said anode and said cathode and in the path of current flow through the cation exchange resin in said first bed to provide an average electrolytic displacement of sorbed cations from the cation exchange resin in said first bed through said second membrane into the catholyte in said third chamber substantially equal to the electrolytic displacement of sorbed anions from the anion exchange resin in said second bed through said first membrane into the anolyte in said first chamber.

3. The apparatus for demineralizing raw water set forth in claim 2, wherein the electrical resistance of said barrier is substantially constant during operation of the apparatus.

4. The apparatus for demineralizing raw water set forth in claim 2, wherein said barrier is of sheet-like construction and is ion permeable.

5. Apparatus for demineralizing raw water containing dissolved metal salts, comprising an electrolytic cell having first and second and third chambers, a first ion permeable membrane disposed as a common wall between said first and second chambers, a second ion permeable membrane disposed as a common wall between second and third chambers, a first bed of cation exchange resin and a second bed of anion exchange resin both disposed in said second chamber, said beds being separate and distinct with respect to each other, the ion exchange resins in said beds also extending in parallel relation with each other between said membranes, means for passing the raw water through said second chamber and into contact with said beds and also into contact with said membranes so as to effect demineralization thereof, an anode disposed in said first chamber, a cathode disposed in said third chamber, said first chamber being adapted to contain a body of anolyte therein in contact with said first membrane and said anode, said third chamber being adapted to contain a body of catholyte therein in contact with said second membrane and said cathode, means for applying an electrical potential between said anode and said cathode and across the ion exchange resins in said beds in parallel relation so as to cause separate electrolytic displacement of sorbed cations from the cation exchange resin in said first bed through said second membrane into the catholyte in said third chamber and of sorbed anions from the anion exchange resin in said second bed through said first membrane into the anolyte in said first chamber, thereby to effect electrical regeneration of the cation exchange resin in said first bed and of the anion exchange resin in said second bed, the cation exchange resin in said first bed having a relatively low electrical resistance between said membranes and the anion exchange resin in said second bed having a relatively high electrical resistance between said membranes, and a barrier having a relatively high electrical resistance and positioned adjacent to one of said membranes and covering at least a part of the portion of said one membrane in contact with the cation exchange resin in said first bed so as to be disposed between said anode and said cathode and in the path of current flow through the cation exchange resin in said first bed and to provide an average electrolytic displacement of sorbed cations from the cation exchange resin in said first bed through said second membrane into the catholyte in said third chamber substantially equal to the electrolytic displacement of sorbed anions from the anion exchange resin in said second bed through said first membrane into the anolyte in said first chamber.

6. The apparatus for demineralizing raw water set forth in claim 5, wherein said barrier is substantially coterminous with all of that portion of the associated membrane in contact with the cation exchange resin in said first bed.

7. The apparatus for demineralizing raw water set forth in claim 5, wherein said barrier is formed of porous ceramic material.

8. The apparatus for demineralizing raw water set forth in claim 5, wherein said barrier is an integral part of the associated membrane.

9. Apparatus for demineralizing raw water containing dissolved metal salts, comprising an electrolytic cell having first and second and third chambers, a first ion permeable membrane disposed as a common wall between said first and second chambers, a second ion permeable membrane disposed as a common wall between said second and third chambers, a first bed of cation exchange resin and a second bed of anion exchange resin both disposed in said second chamber, said beds being separate and distinct with respect to each other, the ion exchange resins in said beds also extending in parallel relation with each other between said membranes, means for passing the raw water through said second chamber and into contact with said beds and also into contact with said membranes so as to effect demineralization thereof, an anode disposed in said first chamber, a cathode disposed in said third chamber, said first chamber being adapted to contain a body of anolyte therein in contact with said first membrane and said anode, said third chamber being adapted to contain a body of catholyte therein in contact with said second membrane and said cathode, means for applying an electrical potential between said anode and said cathode and across the ion exchange resins in said beds in parallel relation so as to cause separate electrolytic displacement of sorbed cations from the cation exchange resin in said first bed through said second membrane into the catholyte in said third chamber and of sorbed anions from the anion exchange resin in said second bed through said first membrane into the anolyte in said first chamber, thereby to effect electrical regeneration of the cation exchange resin in said first bed and of the anion exchange resin in said second bed, the cation exchange resin in said first bed having a relatively low electrical resistance between said membranes and the anion exchange resin in said second bed having a relatively high electrical resistance between said membranes, and a pair of barriers each having a relatively high electrical resistance and respectively positioned adjacent to said first and second membranes, each of said barriers covering at least a part of that portion of the associated one of said membranes in contact with the cation exchange resin in said first bed so as to be disposed between said anode and said cathode and in the path of current flow through the cation exchange resin in said first bed the resistances of said barriers being such as to provide an average electrolytic displacement of sorbed cations from the cation exchange resin in said first bed through said second membrane into the catholyte in said third chamber substantially equal to the electrolytic displacement of sorbed anions from the anion exchange resin in said second bed through said first membrane into the anolyte in said first chamber.

References Cited by the Examiner

UNITED STATES PATENTS

| 2,619,454 | 11/1952 | Zapponi. | |
| 2,846,387 | 8/1958 | Stoddard | 204—151 |
| 2,980,598 | 4/1961 | Stoddard | 204—151 |

FOREIGN PATENTS

| 1,116,048 | 1/1956 | France. |
| 730,819 | 1/1943 | Germany. |

JOHN H. MACK, *Primary Examiner.*

D. R. JORDAN, *Examiner.*